July 31, 1928.
C. RIEGER
COMBINED WALKING STICK AND TRIPOD
Filed Sept. 10, 1927 2 Sheets-Sheet 1
1,679,267
Fig. 1.
Fig. 2.
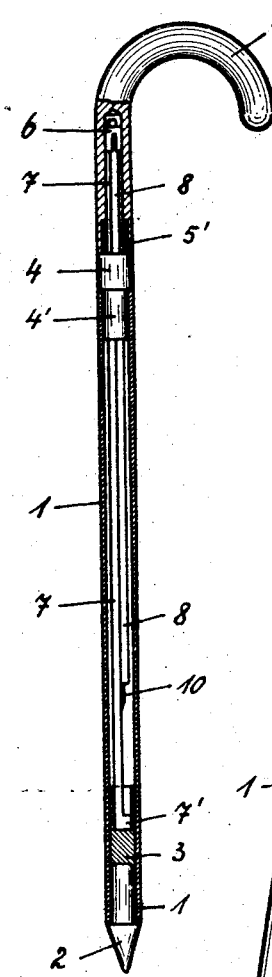
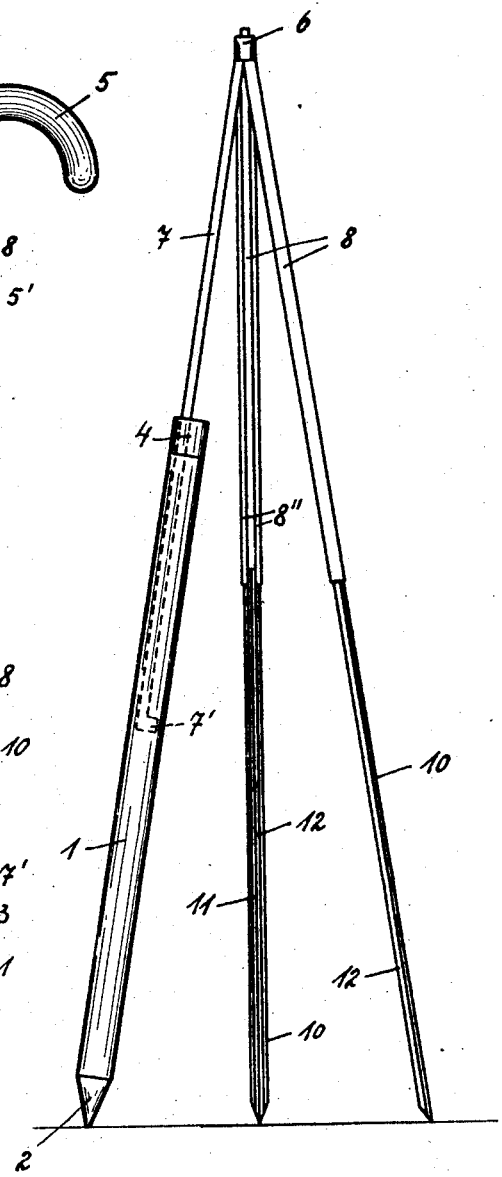
Inventor:
Clara Rieger,
by her Attorney July 31, 1928.  
C. RIEGER  
1,679,267  
COMBINED WALKING STICK AND TRIPOD  
Filed Sept. 10, 1927   2 Sheets-Sheet 2
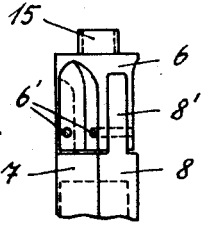
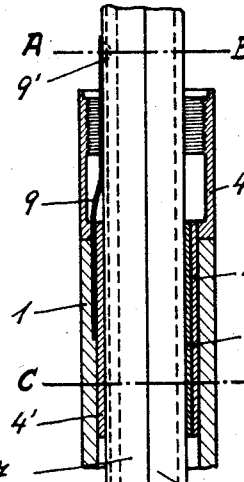
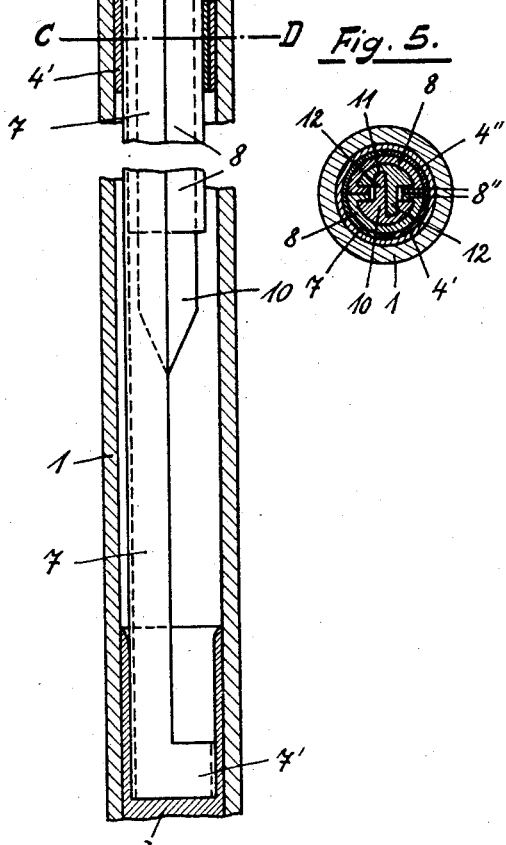
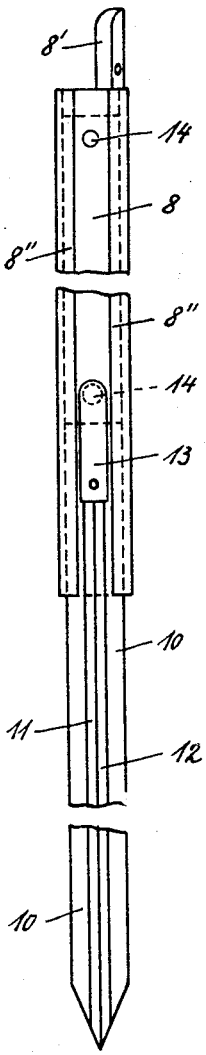
Inventor:  
Clara Rieger,  
by her Attorney:

Patented July 31, 1928.

1,679,267

UNITED STATES PATENT OFFICE.

CLARA RIEGER, OF REUTLINGEN, GERMANY.

COMBINED WALKING STICK AND TRIPOD.

Application filed September 10, 1927, Serial No. 218,760, and in Germany September 10, 1926.

The present invention relates to a combined walking stick and tripod, more particularly for photographic apparatus, and consists of a hollow stick which may be used to form one of the legs of the tripod and in the cavity of which telescopic tripod legs of semicylindrical cross section can be housed.

The novelty is comprised in the circumstance that a special telescopic portion of hollow semi-cylindrical cross section is slidably mounted in the hollow stick, the other two telescopic legs of the tripod being articulated to the upper end of the special telescopic portion. Parts of the last mentioned two telescopic legs of the tripod are of semicylindrical cross section and fit into the cavity in the aforementioned special telescopic portion and in the hollow stick. In order with this new arrangement to render it possible to swing both of the legs of the tripod out of the cavity in the telescopic portion, the pins on both of the tripod legs and which engage into the articulated or head piece are not arranged symmetrically to the cross section of the leg, but are displaced laterally. The telescopic portion, which consists of half a tube, is guided by a semicylindrical shaped tube fixed in the shaft of the stick and is thereby prevented from turning, the semi-cylindrical shaped tube acting at the same time as a stop for the telescopic portion which is formed at its lower end as a complete tube. A further novelty is comprised in the shape of the cross section of the telescopic extensions housed in the other two legs of the tripod which consist of profile rods the strengthening ribs of which are arranged eccentrically in such a way that when folded up they lie alongside one another. In order to enable these ribs to be made higher, each of the rods is provided with an eccentrically placed groove alongside its rib into which the rib of the other rod enters when the apparatus is folded up.

In accordance with this invention a combined walking stick and tripod has been devised which when folded up cannot be distinguished from an ordinary walking stick and which nevertheless retains all the advantages of the usual type of tripod.

A form of execution of the invention is shown by way of example on the drawing. Fig. 1 is a longitudinal section of the combination walking stick and tripod folded up. Fig. 2 shows the tripod as erected. Fig. 3 is a longitudinal section through part of the folded-up combination stick and tripod, the handle and end of the stick being omitted.

Figs. 4 and 5 are cross sections along the lines A—B and C—D in Fig. 3. Fig. 6 shows one of the telescopic legs of the tripod, as viewed from inside.

Into the hollow stick 1 which may be made of wood, fibre, or the like, is inserted, at its lower end a piece 3 carrying the point or ferrule 2 and at its upper end a bush or sleeve 4, this sleeve being inserted by means of the tube 4' to which it is rigidly connected. The handle 5 of the stick can by means of a threaded tube 5' be screwed on to the sleeve 4 which is threaded on the inside. The telescopic portion or the semicylindrical tube 7 and the semi-cylindrical shaped tubes 8 of somewhat smaller diameter are articulated to the link 6 by means of the bolts 6' respectively. The tangs 8' of the tubes 8 are not arranged symmetrically to the cross section of the tube, but are displaced laterally, so as to enable the tubes 8 to be easily swung out of the telescopic portion 7.

In order to obtain a precise guiding for the tube 7, the tube 4' is connected to a semi-cylindrical tube 4" which supplements the tube 7. Thus, the tube 7 is precisely guided and cannot rotate with regard to the stick 1. At the same time the tube 4" forms with its lower edge a stop for the tube 7 which is closed below at 7' so that the tube 7 cannot be fully withdrawn from the stick 1. In order to fix the tube or the telescopic portion 7 in its various positions, use is made of a spring 9 the stop 9' of which snaps into holes provided at suitable places in the tube 7.

The rod like extensions 10 are slidable in the tubes 8, as they run between the radially directed ribs 8" of the tubes 8. The extension rods 10 are made of fully profiled material, of segmental section, and have an eccentric groove 11 and an eccentric rib 12. When folded up, the rib 12 of the one rod 10 engages the groove 11 of the other rod 10, as plainly seen in Figs. 4 and 5. The rods 10 are very stiff and when folded together take up very little space; they can be held fixed in the longitudinal direction by means of springs 13 which are attached to the rods 10 and the stops of which snap into suitable holes 14 in the tubes 8. It may be mentioned that the parts 4, 4' and 4" may also consist of one piece and that the lower piece 3 is preferably provided with a bore to receive the lower tube or tube end 7'. The guiding piece 4" could also be subdivided in such a way that only two strips lie against the longitudinal edges of the tube 7 whilst a third central strip lies against the tubes 8.

When it is required to set up the tripod, the handle 5 is first screwed off the stick 1 and the telescopic portion 7 is drawn out of the stick 1 until its end 7' lies against the tube 4". Then the tubes 8 which serve the purpose of legs for the tripod are swung out of the telescopic portion 7, whereupon their extensions 10 are drawn out and secured at the desired length by means of the springs 13. To suit the length of the legs 8 and 10 of the tripod the telescopic portion 7 is pushed slightly back again into the stick 1 and bolted in the desired position by means of the spring 9, for which purpose several holes are provided in the telescopic portion 7.

The legs of this combination of walking stick and tripod are severally adjustable and the tripod can therefore be set up on any kind of ground. A photographic or similar apparatus can be screwed on to the threaded pin 15 provided on the articulated head 6.

What I claim as my invention and desire to secure by Letters Patent of the United States is:—

1. A tripod stick comprising in combination an outer casing, a hollow semi-cylindrical tube adapted to slide therein, a head on said tube, and two telescopic legs articulated to said head, the said legs being exteriorly of semi-cylindrical shape and adapted to fit against the interior surface of said semi-cylindrical tube.

2. A tripod stick comprising in combination an outer casing, a hollow semi-cylindrical tube adapted to slide therein, a head on said tube, and two telescopic legs articulated to said head, the said legs being exteriorly of semi-cylindrical shape and adapted to fit against the interior surface of said semi-cylindrical tube and the articulations such that the said legs diverge when swung out from the said tube.

3. A tripod stick comprising in combination an outer casing, a hollow semi-cylindrical tube adapted to slide therein, a head on said tube, and two telescopic legs articulated to said head, the said legs being exteriorly of semi-cylindrical shape and adapted to fit against the interior surface of said semi-cylindrical tube, together with a semi-cylindrical socket in said casing for guidance of said tube.

4. A tripod stick comprising in combination an outer casing, a hollow semi-cylindrical tube adapted to slide therein, a head on said tube, and two telescopic legs articulated to said head, the said legs being exteriorly of semi-cylindrical shape and adapted to fit against the interior surface of said semi-cylindrical tube, together with a semi-cylindrical socket in said casing for guidance of said tube and a stop on the end of said tube adapted to abut against said socket.

5. A tripod stick comprising in combination an outer casing, a hollow semi-cylindrical tube adapted to slide therein, a head on said tube, and two telescopic legs articulated to said head, the said legs being exteriorly of semi-cylindrical shape and adapted to fit against the interior surface of said semi-cylindrical tube, together with extension pieces in said legs consisting of profiled rods having non-central ribs.

6. A tripod stick comprising in combination an outer casing, a hollow semi-cylindrical tube adapted to slide therein, a head on said tube, and two telescopic legs articulated to said head, the said legs being exteriorly of semi-cylindrical shape and adapted to fit against the interior surface of said semi-cylindrical tube, together with extension pieces in said legs consisting of profiled rods having non-central ribs and non-central grooves alongside said ribs.

In witness whereof I have signed this specification.

CLARA RIEGER.